United States Patent
Murao

(10) Patent No.: US 7,584,678 B2
(45) Date of Patent: Sep. 8, 2009

(54) POWER TRANSMISSION METHOD AND DEVICE HAVING LOAD SENSING THRUST AUGMENTATION MECHANISM

(75) Inventor: Yoshio Murao, Hyogo (JP)

(73) Assignee: Scientific Technologies Ltd., Kobe-shi (JP)

( * ) Notice: Subject to any disclaimer, the term of this patent is extended or adjusted under 35 U.S.C. 154(b) by 362 days.

(21) Appl. No.: 11/662,726

(22) PCT Filed: Sep. 13, 2005

(86) PCT No.: PCT/JP2005/016818

§ 371 (c)(1),
(2), (4) Date: Mar. 14, 2007

(87) PCT Pub. No.: WO2006/030768

PCT Pub. Date: Mar. 23, 2006

(65) Prior Publication Data

US 2007/0251342 A1    Nov. 1, 2007

(30) Foreign Application Priority Data

Sep. 16, 2004   (JP)   ............... 2004-269802

(51) Int. Cl.
*F16H 27/02*    (2006.01)
(52) U.S. Cl. .............. 74/89.23; 74/89.29; 74/89; 100/289; 100/904
(58) Field of Classification Search ............ 74/89, 74/89.23, 89.29; 100/289, 904
See application file for complete search history.

(56) References Cited

U.S. PATENT DOCUMENTS

| 3,380,316 A | * | 4/1968 | Wilkinson ............... 74/89.37 |
| 3,642,405 A | * | 2/1972 | Eggenberger et al. ....... 425/149 |
| 3,730,016 A | | 5/1973 | Miller |
| 2002/0162409 A1 | * | 11/2002 | Ito et al. ................ 74/89.23 |

FOREIGN PATENT DOCUMENTS

| DE | 2261736 | | 6/1974 |
| EP | 0024043 | A2 | 2/1981 |
| EP | 0994260 | A2 | 4/2000 |
| GB | 2211908 | A | 7/1989 |
| JP | 61-180064 | A | 8/1986 |
| JP | 5-164209 | A | 6/1993 |
| JP | 09253963 | A | 9/1997 |
| JP | 10-122323 | A | 5/1998 |
| JP | 11-151632 | A | 6/1999 |
| JP | 2003-214518 | A | 7/2003 |

\* cited by examiner

*Primary Examiner*—David M Fenstermacher
(74) *Attorney, Agent, or Firm*—Birch, Stewart, Kolasch & Birch, LLP

(57) ABSTRACT

An inexpensive and high efficiency power transmission method and device with a simple structure for converting a rotational motion into a linear motion in accordance with a load is provided. A feed screw (21) and a female screw (22) having a larger diameter than the feed screw are engaged in an eccentric manner. A counterforce from a work is detected by a helical spring (28). Then, rotation restraint of the female screw (22) engaged in an eccentric manner is released, and the female screw (22) is rotated. The feed screw (21) and the female screw (22) rotate in a differential manner so that traveling speed is decreased and that pressing force is increased.

20 Claims, 15 Drawing Sheets

FIG. 11
(A)
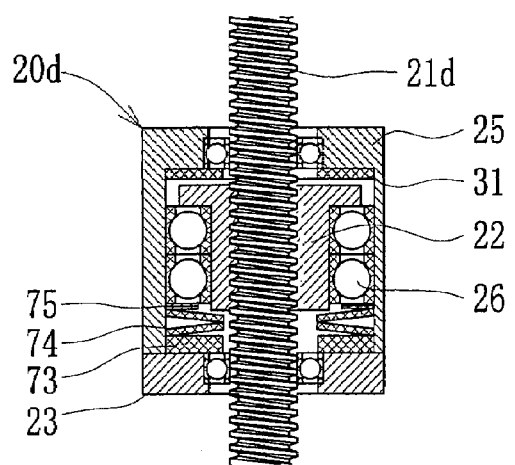
(B)
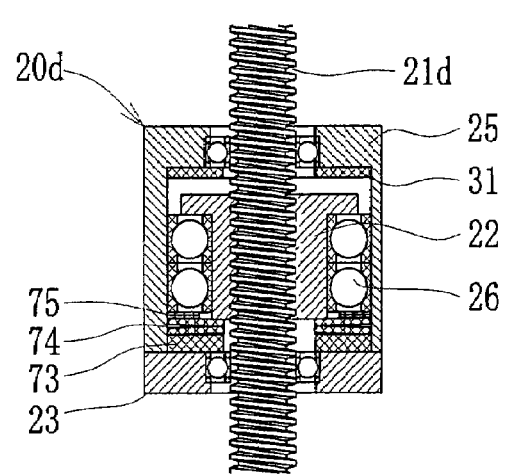

POWER TRANSMISSION METHOD AND DEVICE HAVING LOAD SENSING THRUST AUGMENTATION MECHANISM

TECHNICAL FIELD

The present invention relates to a power transmission method and device for converting a rotational motion into a linear motion. More specifically, the present invention relates to a power transmission method and device as well as a pressure loading device that is used in the case of applying a necessary pressure by a linear motion to an object. It moves fast from a static state to contact with the object. After contacting or clamping the object, it detects a load with a load sensing mechanism using a spring. When the detected load becomes a set value or larger, it decreases a traveling speed in an autonomous manner and generates a high thrust efficiently.

BACKGROUND ART

In every industrial field, various devices for press fitting, presswork or clamping of an object have been used, which utilize a power source such as man power, a pneumatic cylinder or an electric motor.

In the case of a small pressing machine for example, many pressing machines that use man power have a mechanism for operating a lever handle by man power so as to rotate a pinion gear that is coupled to a shaft of the lever handle for applying a rectilinear thrust to a rack shaft. Other than this mechanism, a cam mechanism or a link mechanism is used for amplifying a force so as to obtain a thrust. Although the pressing machine that uses man power can be manufactured with low cost because of a simple mechanism and structure, it is not suitable for a stable work because the pressing force depends on man power. In addition, the use of man power means consuming a labor cost that is most expensive among fixed manufacturing costs, which goes against the recent trend toward a labor-saving device or a motorized device. For this reason, a pressing device utilizing a pneumatic cylinder or an electric motor has been used in many cases recently.

A pressing device utilizing a pneumatic cylinder has advantages that a stable pressing force can be obtained by supplying compressed air having controlled pressure to the cylinder and that it can be manufactured with relatively low cost because of its simple mechanism, so it is used in many cases. However, it needs compressed air as a power source, and an air compressor has to be installed. In addition, necessary power for a press fitting or caulking work depends on the pressing force and the traveling speed at a work position, but the thrust of the pneumatic cylinder is determined by a product of a sectional area of the cylinder and pressure of supplied air. Therefore, the energy of the compressed air corresponding to the sum of a volume of an idle running distance to the work position and a volume of a return stroke is consumed in vain.

On the other hand, a pressing device utilizing an electric motor obtains a necessary thrust by converting a rotational motion into a linear motion after amplifying an output torque of the electric motor by a speed reducer or the like so that the pressing force at the work position is increased. However, only reducing the speed simply causes decrease of the number of rotation so that it takes time to move the idle running distance.

There are various methods and devices that have been developed for reducing energy consumption and shortening cycle time in a power transmission device that uses a pneumatic cylinder or an electric motor. For example, as a power transmission mechanism that utilizes an electric motor, there are "power transmission method and device for converting rotational motion into rectilinear motion" described in Japanese unexamined patent publication No. 5-164209 and "machine tool" described in Japanese unexamined patent publication No. 11-151632.

A technique that is common to descriptions in the above-mentioned documents is to obtain a necessary pressing force by moving at high speed and low thrust during an interval of the idle running distance, by switching speed reducers by a clutch or the like at the work position for performing press fitting or caulking so that speed reduction and thrust augmentation are performed. According to each of these conventional techniques, the mechanism becomes complicated so it is difficult to provide an inexpensive device.

An object of the present invention considering the above-mentioned problem is to realize an inexpensive power transmission method and device that has a simple mechanism for switching speeds of linear motion and for amplifying a thrust in an autonomous manner.

DISCLOSURE OF THE INVENTION

A method according to one aspect of the present invention is a power transmission method for converting a rotational motion of an electric motor into a linear motion. The method includes the steps of disposing a feed screw that rotates by an output of the electric motor, disposing a moving case through which the feed screw penetrates in the axis direction, the feed screw being rotatable relatively to the moving case so as to transmit a thrust along the axis direction of the feed screw to a load, disposing a female screw in the moving case, the female screw having an effective diameter that is larger than an effective diameter of the feed screw so as to generate the thrust by engaging with the feed screw in an eccentric manner, disposing a bearing in the moving case for supporting the female screw in a rotatable manner relatively to the moving case, the bearing itself being capable of moving in the axis direction with respect to the moving case, disposing a spring element in the moving case for pressing the female screw via the bearing in the axis direction and for pressing one end surface of the female screw onto the inner surface of the moving case in a no load state, and rotating the feed screw by the electric motor so that the rotation of the feed screw generates the thrust on the female screw and the moving case, and that when a thrust generated on the female screw due to a counterforce received by the moving case from a load becomes larger than a restoring force of the spring element, the female screw moves in the axis direction with respect to the moving case so that one end surface of the female screw separates from the inner surface of the moving case, and that the restraint of relative rotation of the female screw with respect to the moving case is released, and that the feed screw and the female screw rotate in a differential manner to generate the thrust.

A device according to another aspect of the present invention is a device for converting a rotational motion of an electric motor into a linear motion. The device includes a feed screw that is connected to an output shaft of the electric motor so as to rotate, a female screw having an effective diameter that is larger than an effective diameter of the feed screw, a moving case whose relative rotation is restrained with respect to rotation of the feed screw, a bearing for supporting loads in the radial direction and in the axis direction so that the female screw can rotate in the moving case and can slide in the axis direction, and a spring element for pressing a brake disk that is disposed in the moving case and is attached to an end surface of the female screw integrally onto one of inner surfaces of the moving case. The feed screw penetrates bearings that are disposed at both end covers of the moving case and is arranged in an eccentric manner from the female screw housed in the moving case. When the moving case receives a counterforce from a load so that a thrust generated on the female screw becomes larger than a pressing force of the spring element, the female screw moves in the axis direction with respect to the moving case so that the brake disk separates from one of the inner surfaces of the moving case, and that the restraint of relative rotation of the female screw with respect to the moving case is released, and that the feed screw and the female screw rotate in a differential manner.

Preferably, an initial pressing force of the spring element is set to a value smaller than or equal to a force for moving the female screw by a rotation torque of the feed screw in the state where rotation of the female screw is restrained, and a restoring force of the spring element at the maximum deflection is set to a value larger than a thrust generated by differential rotation due to rotation of the female screw.

In addition, the feed screw may have a cross section of a polygonal shape at a part connected to the output shaft of the electric motor.

In addition, the end surface of the moving case may be provided integrally with a load converting portion for detecting a thrust in the axis direction and for converting the detected thrust into an electric signal.

A device according to yet another aspect of the present invention is a power transmission device for converting a rotational motion of an electric motor into a linear motion that is transmitted to a load. The device includes a feed screw that rotates by an output of the electric motor, a moving case through which the feed screw penetrates in the axis direction, the feed screw being rotatable relatively to the moving case so as to transmit a thrust along the axis direction of the feed screw to a load, a female screw disposed in the moving case, the female screw having an effective diameter that is larger than an effective diameter of the feed screw so as to generate the thrust by engaging with the feed screw in an eccentric manner, a bearing disposed in the moving case for supporting the female screw in a rotatable manner relatively to the moving case, the bearing itself being capable of moving in the axis direction with respect to the moving case, a brake shoe fixed to the moving case for restraining relative rotation of the female screw with respect to the moving case when an end surface of the female screw is pressed onto the brake shoe, and a spring element disposed in the moving case for pressing the female screw via the bearing in the axis direction so that an end surface of the female screw is pressed onto the brake shoe in a no load state. When the moving case receives a counterforce from a load so that a thrust generated on the female screw becomes larger than a restoring force of the spring element, the female screw moves in the axis direction with respect to the moving case so that the end surface separates from the brake shoe, and that the restraint of relative rotation of the female screw with respect to the moving case is released, and that the feed screw and the female screw rotate in a differential manner.

In addition, a pressure loading device may include an upper frame to which the electric motor is attached, an output rod cover, and a casing disposed between the upper frame and the output rod cover. The upper frame, the casing and the output rod cover may be connected to each other integrally with a tie bar. The moving case may be arranged in a slidable manner along the inner surface of the casing in the axis direction, and an output rod is attached to the moving case so that the output rod penetrates the output rod cover in a slidable manner.

According to the present invention, it is possible to realize a method and a device for switching a linear speed and a thrust in an autonomous manner with a small number of structural elements and a simple component structure, so that a power transmission mechanism can be manufactured with low cost.

BRIEF DESCRIPTION OF THE DRAWINGS

FIG. 11 is a cross section showing an operating state of a power converting portion moving case of the pressure loading device.

BEST MODE FOR CARRYING OUT THE INVENTION

Figure 1:
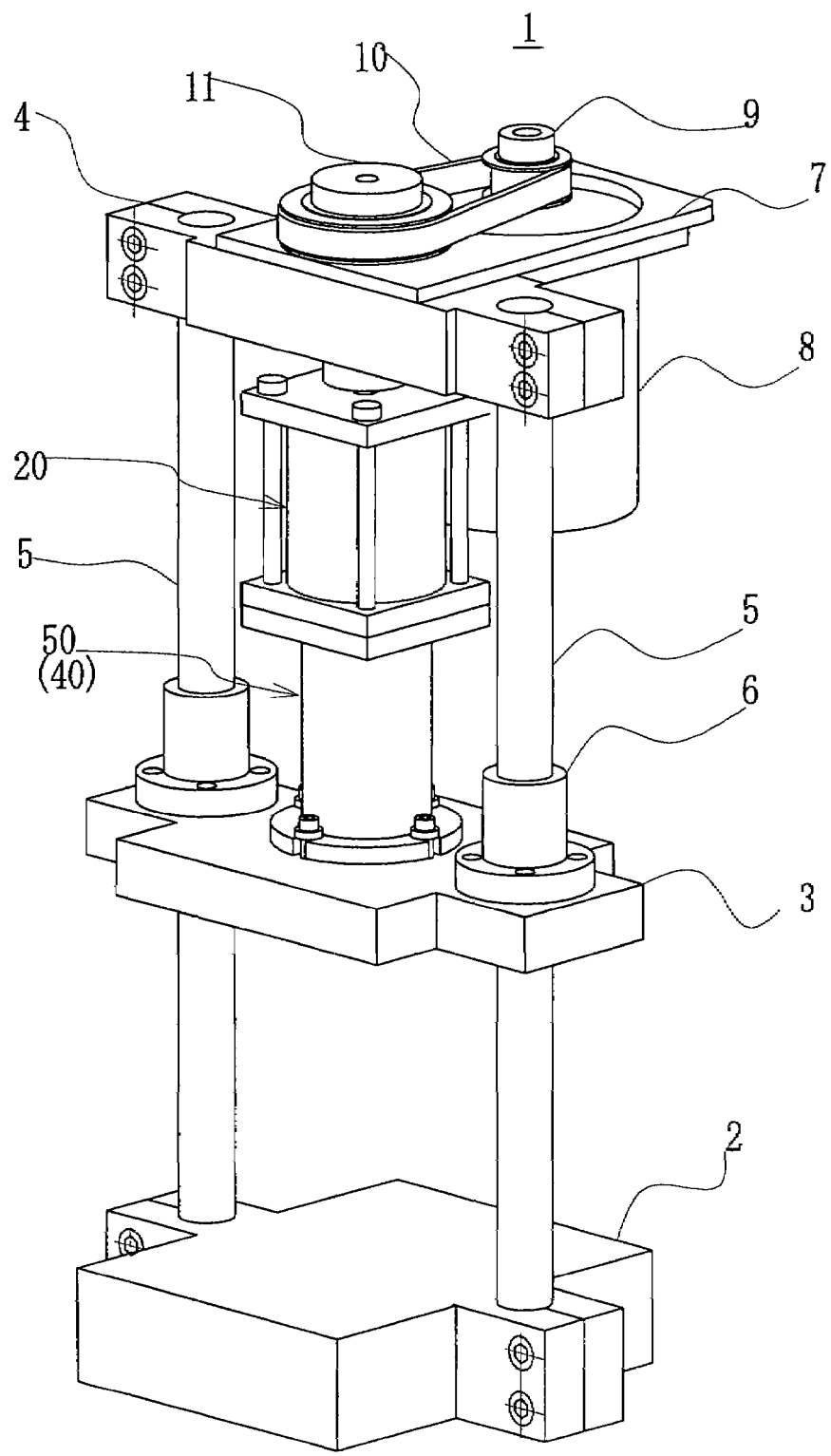
FIG. 1 is a perspective view showing an appearance of a pressure loading device according to an embodiment of the present invention.
Figure 2:
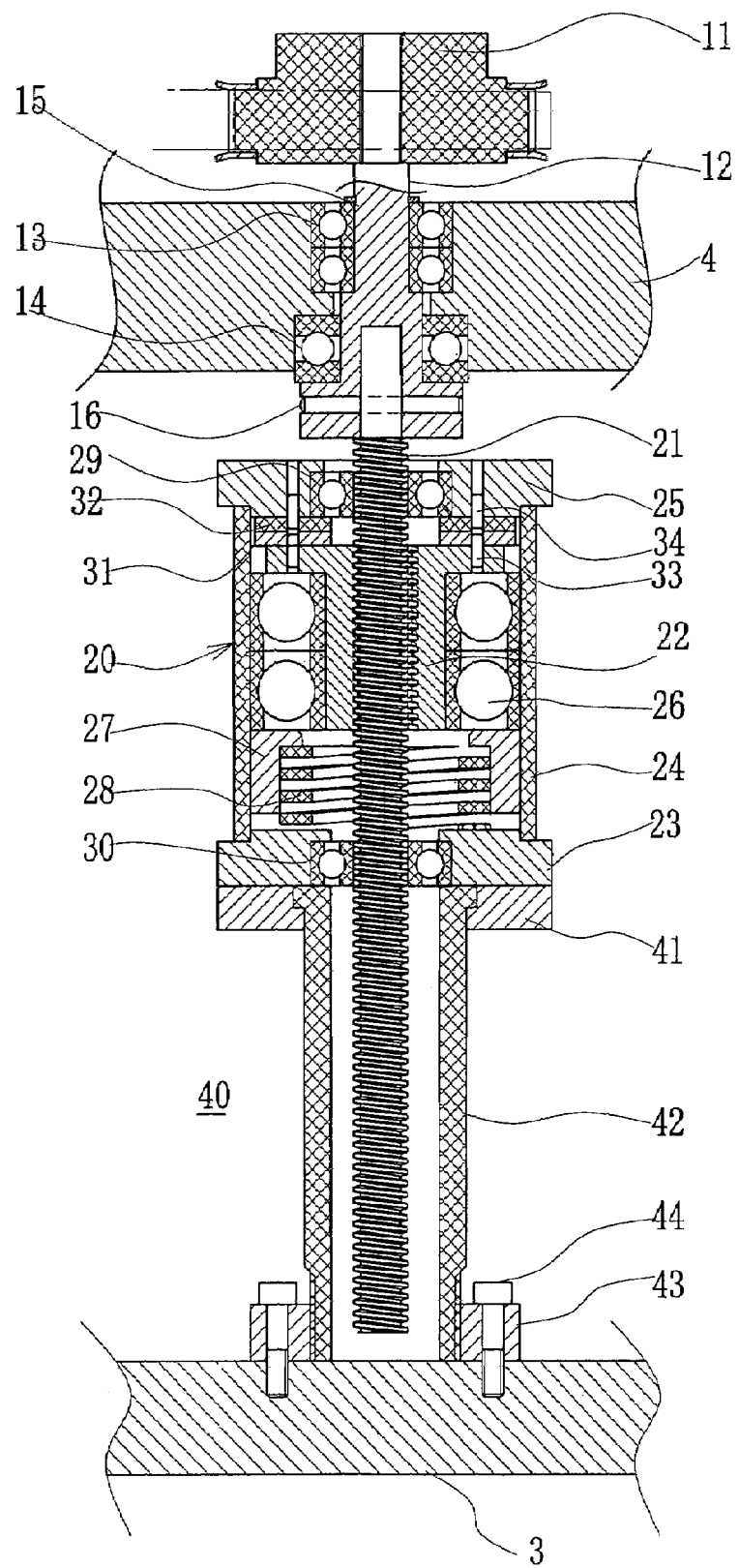
FIG. 2 is a cross section of the pressure loading device.
Figure 3:
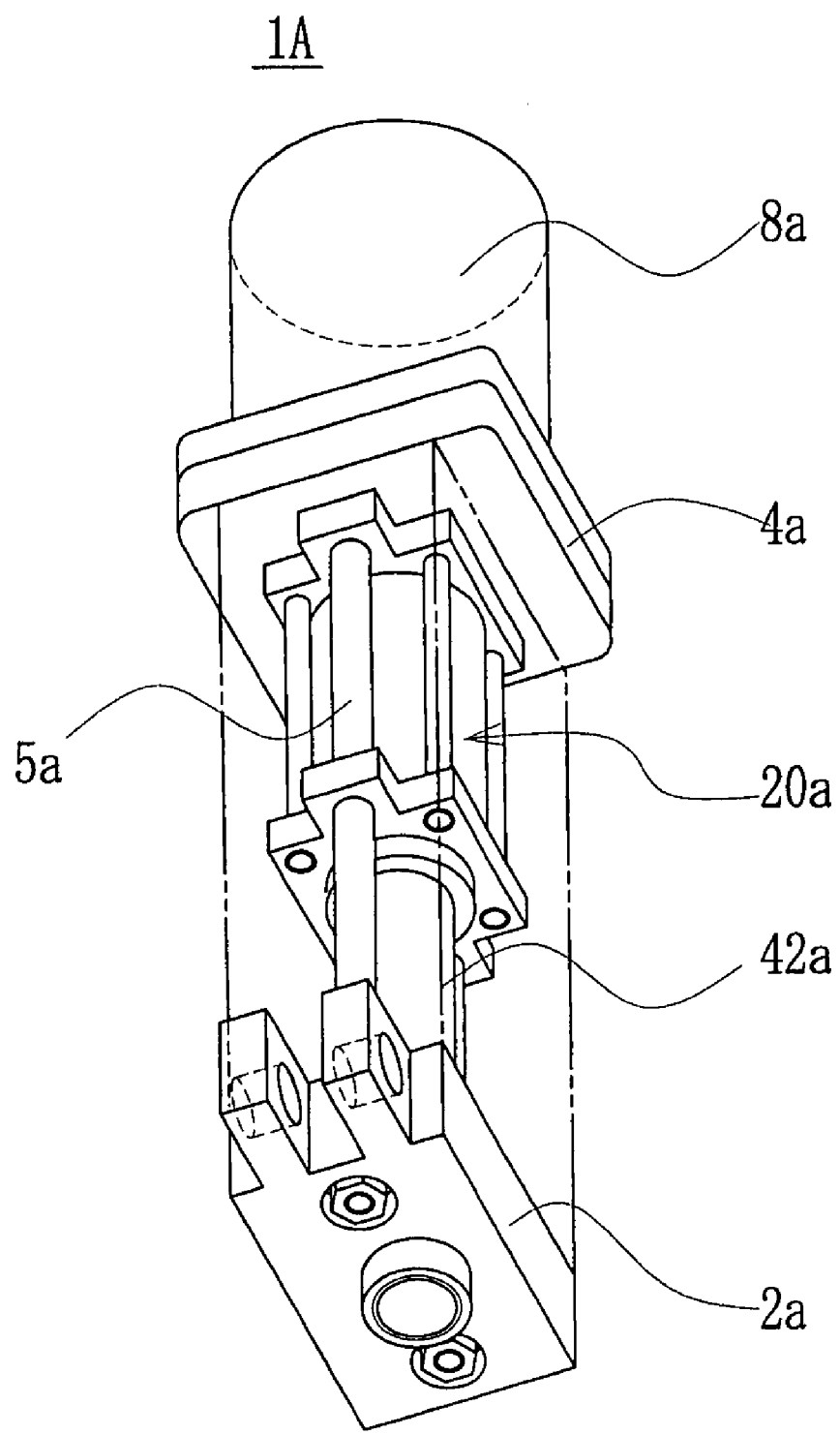
FIG. 3 is a perspective view showing an appearance of a clamping device according to an embodiment of the present invention.
Figure 4:
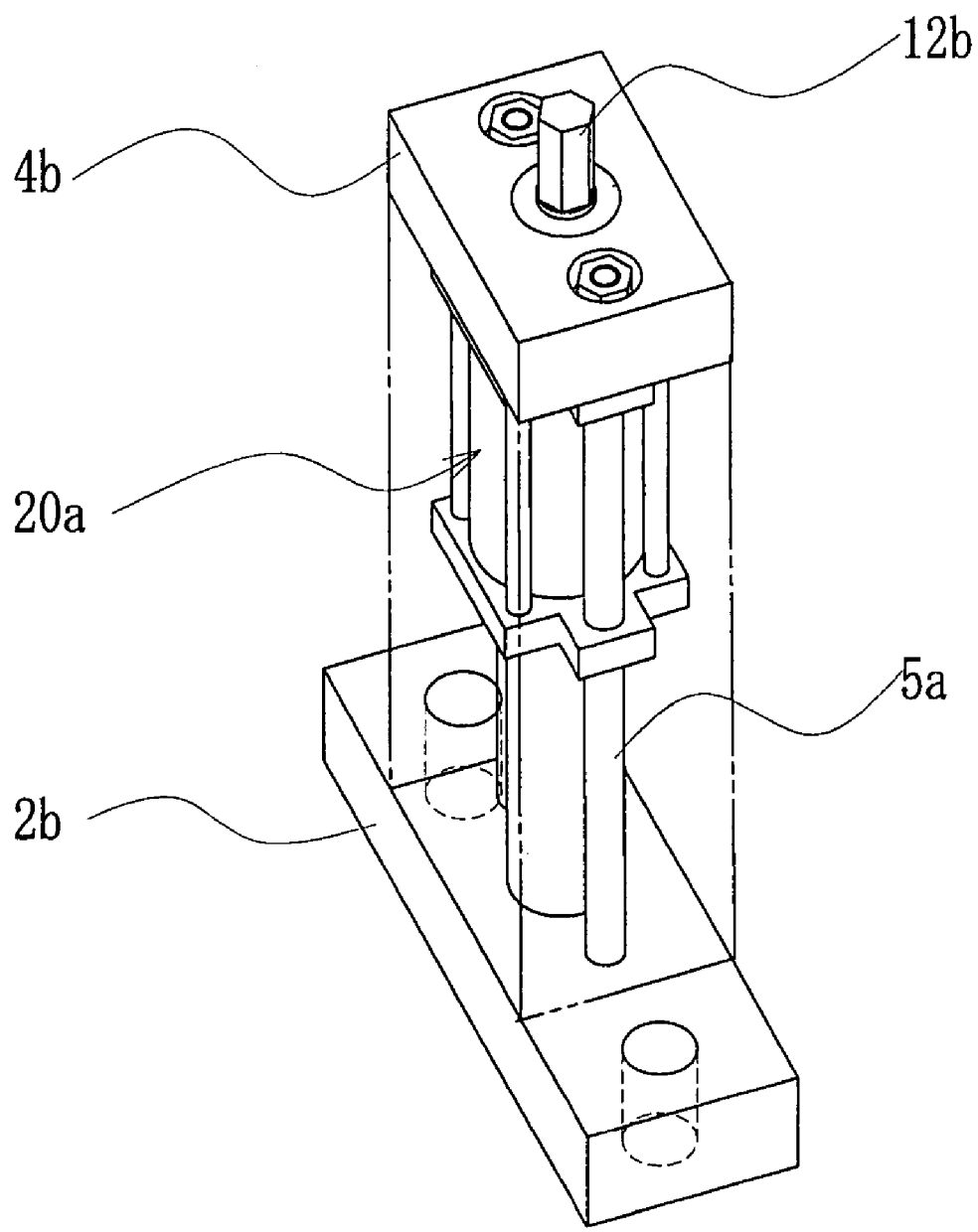
FIG. 4 is a perspective view showing an appearance of a clamping unit according to an embodiment of the present invention.
Figure 5:
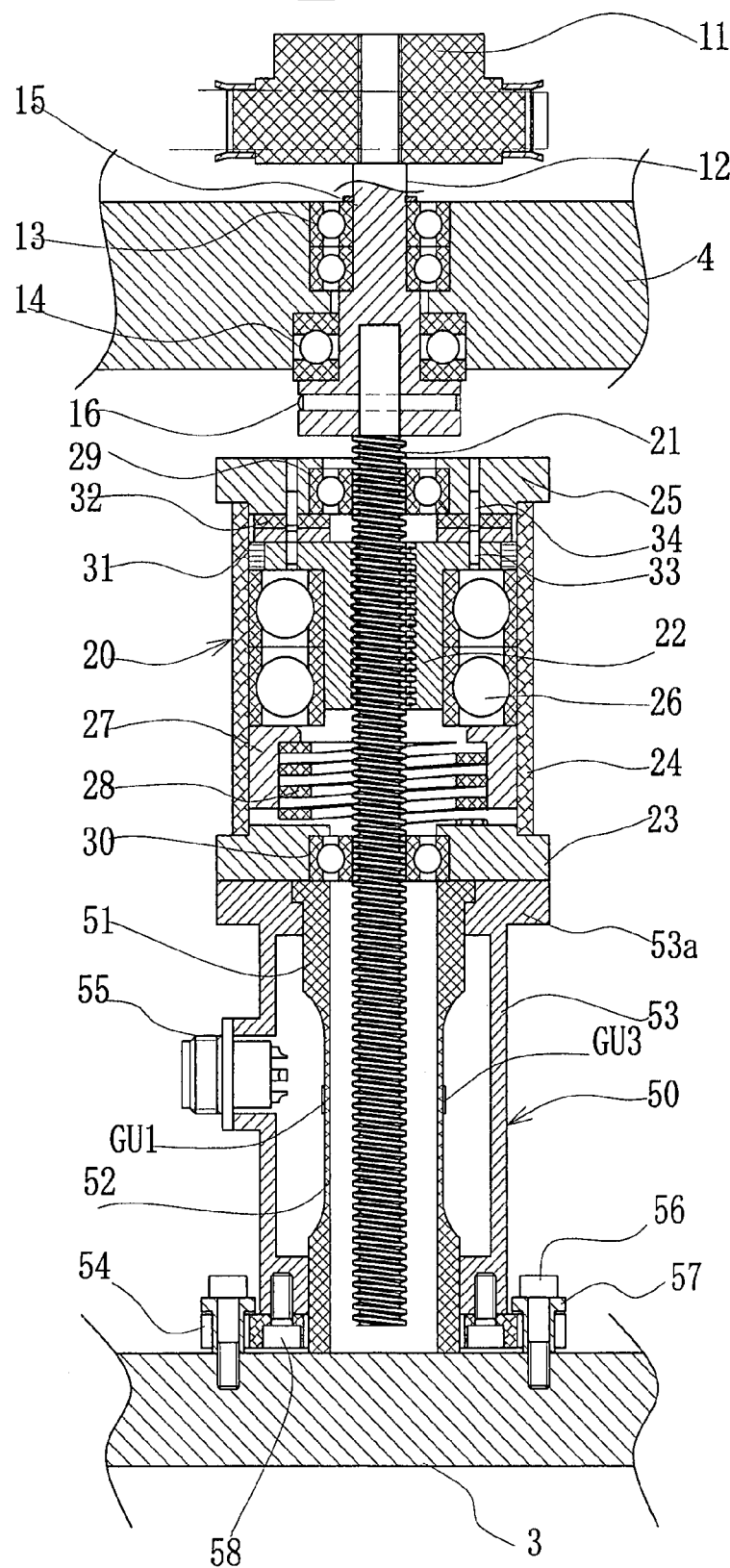
FIG. 5 is a cross section of a pressure loading device according to another embodiment.
Figure 6:
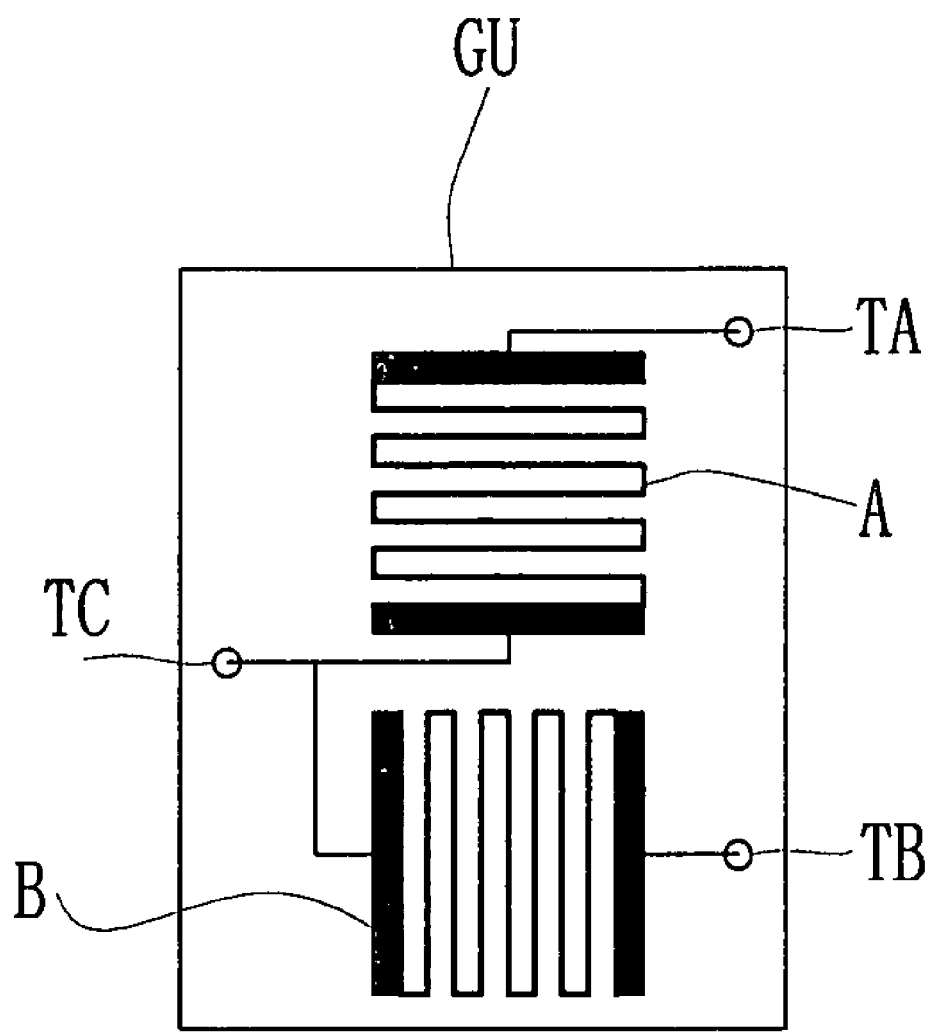
FIG. 6 is a diagram showing a conceptional structure of a strain gage.
Figure 7:
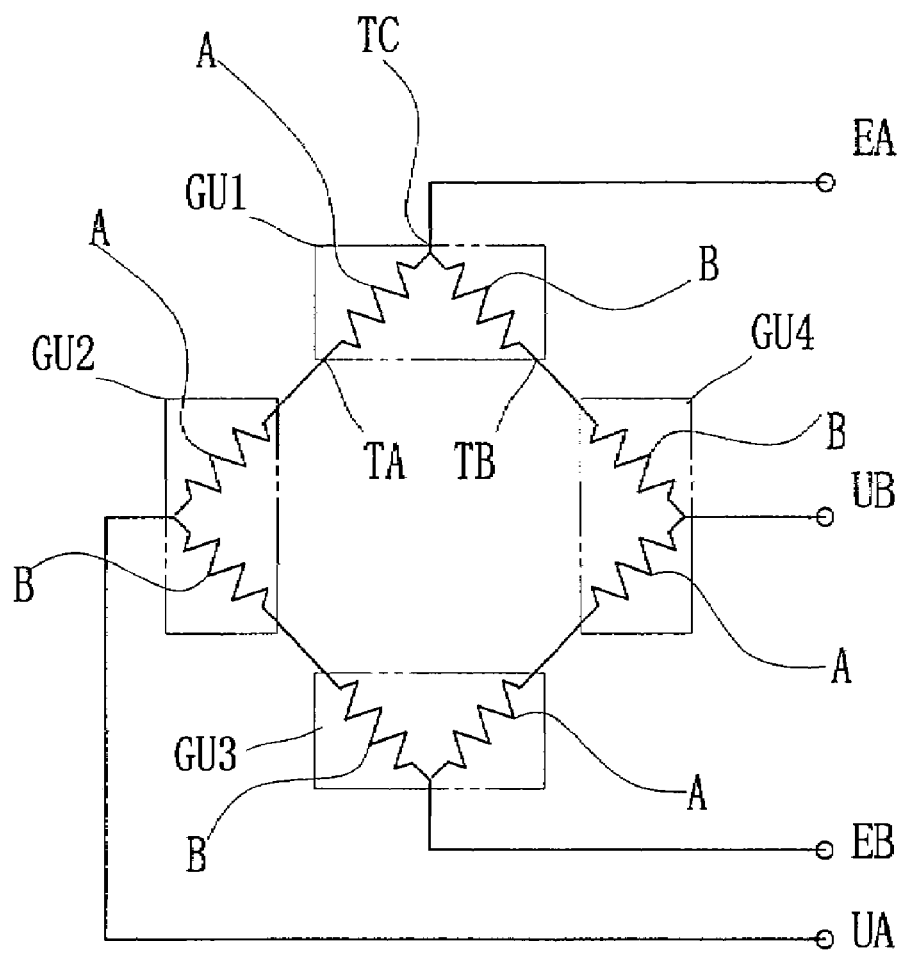
FIG. 7 is a diagram showing an example of a bridge circuit for detecting a load so as to obtain a voltage output.

FIG. 1 is a perspective view showing an appearance of a pressure loading device 1 according to an embodiment of the present invention, FIG. 2 is a cross section of the pressure loading device 1, FIG. 3 is a perspective view showing an appearance of a clamping device 1A according to an embodiment of the present invention, FIG. 4 is a perspective view showing an appearance of a clamping unit 1B according to an embodiment of the present invention, FIG. 5 is a cross section of a pressure loading device 1C according to another embodiment, FIG. 6 is a diagram showing a conceptional structure of a strain gage, and FIG. 7 is a diagram showing an example of a bridge circuit for detecting a load so as to obtain a voltage output.

In FIGS. 1 and 2, the pressure loading device 1 to which a power transmission device according to the present invention is applied includes a base 2 and an upper frame 4 that are connected to each other via two tie bars 5, 5, and two guide bearings 6, 6 that are attached to a pressurizing plate 3 integrally and slide in the vertical direction along the tie bars 5, 5 as guide rods. The pressurizing plate 3 is equipped with an output rod assembly 40 and a power converting portion moving case 20 that are attached to the pressurizing plate 3 integrally.

The upper frame 4 is provided with an electric motor 8 that is attached to the upper frame 4 via a plate 7. A rotation force of the electric motor 8 is transmitted to a large timing pulley 11 via a small timing pulley 9 and a timing belt 10, so as to rotate a feed screw 21 via a rotation transmission shaft 12. The upper frame 4 supports the rotation shaft 12 by a deep groove ball bearing 13 and a thrust ball bearing 14 in a rotatable manner, and a retaining ring 15 is used for preventing it from removing. The rotation transmission shaft 12 and the feed screw 21 are connected to each other via a pin 16 and rotate as one unit.

Although the rotation shaft 12 and the feed screw 21 are manufactured separately and connected to each other in the present embodiment, it is possible to form them as one unit. In addition, although roller bearings are used as the deep groove ball bearing 13 and the thrust ball bearing 14 that retain the rotation shaft 12 in the present embodiment, it is possible to use other type of bearing. For example, it is possible to use a couple of taper roller bearings.

The power converting portion moving case 20 has a housing that is made up of a cylindrical tube 24, a plate-like upper cover 25 disposed at the upper end surface of the tube 24, a plate-like bottom cover 23 disposed at the lower end surface of the tube 24 and four tie bolts for connecting the upper cover 25 to the bottom cover 23. On the inner surface of the tube 24, there are a female screw 22 that has an effective diameter larger than the effective diameter of the feed screw 21 and has a flange portion at one side, and a deep groove ball bearing 26 for retaining the female screw 22 in a rotatable manner, which are incorporated in a slidable manner.

In addition, on the inner surface of the tube 24, there is a spring retainer 27 that is incorporated in a slidable manner. A helical spring 28 is retained between the spring retainer 27 and the bottom cover 23 in a compressed state. Therefore, the helical spring 28 presses the female screw 22 upward by its restoring force via the spring retainer 27 and the deep groove ball bearing 26, so that a brake lining 31 that is provided to the flange portion of the female screw 22 integrally is pressed onto a brake shoe 32 that is provided to the upper cover 25 integrally.

The upper cover 25 and the bottom cover 23 are provided with deep groove ball bearings 29 and 30 for retaining the feed screw 21 in a slidable manner at an axis position shifted from an axis of the female screw 22. More specifically, the feed screw 21 is supported by the deep groove ball bearings 29 and 30 in a rotatable manner and in a movable manner in the axis direction. It is eccentrically disposed from the female screw 22 and is inscribed and engaged with the female screw 22 at one position in the circumferential direction. Thus, if the female screw 22 cannot rotate when the feed screw 21 is driven to rotate, the female screw 22 is driven to move linearly in the axis direction by the screw action between the feed screw 21 and the female screw 22. In addition, if the female screw 22 is in a rotatable state, the feed screw 21 is inscribed with the female screw 22, which is driven to rotate at the number of rotation less than that of the feed screw 21. As a result, the female screw 22 is driven to move linearly in the axis direction by the screw action due to a difference between the number of rotation of the female screw 22 and the number of rotation of the feed screw 21.

When the female screw 22 is driven to move linearly in the axis direction, it drives the bottom cover 23 to move in the same direction via the flange portion of the female screw 22, the deep groove ball bearing 26, the spring retainer 27 and the helical spring 28. The bottom cover 23 is connected to an upper flange 41 of the output rod assembly 40 by the four tie bolts described above.

The output rod assembly 40 is made up of the upper flange 41, an output rod 42 that is sandwiched between the upper flange 41 and the bottom cover 23 so as to be connected to them, and a lower flange 43 that is connected to the output rod 42 by screws. The lower flange 43 is connected to the pressurizing plate 3 by bolts 44. Therefore, the pressurizing plate 3 moves together with the power converting portion moving case 20 as one unit.

The feed screw 21, which is driven by the electric motor 8 to rotate, moves the eccentrically engaged female screw 22 at a speed of the product of number of rotation and the screw pitch in the idle running zone. The movement of the female screw 22 presses the bottom cover 23 of the power converting portion moving case 20 via the deep groove ball bearing 26, the spring retainer 27 and the helical spring 28 so that the pressurizing plate 3 connected to the bottom cover 23 is moved downward at high speed.

When the pressurizing plate 3 comes into contact with a work and receives a counterforce from the work, the movement of the pressurizing plate 3 in the downward direction is restricted. Then, the rotation torque of the feed screw 21 overcomes an initial pressing force applied to the female screw 22 by the helical spring 28 so that the female screw 22 is pressed downward. As a result, the brake that restrains rotation of the female screw 22 is released, so that the female screw 22 starts to rotate in engagement with the feed screw 21.

The number of rotation of the female screw 22 depends on quantity of eccentricity between the feed screw 21 and the female screw 22. When radius values of the feed screw 21 and the female screw 22 at the contact point are denoted by r1 and r2 respectively, the female screw 22 rotates at r1/r2 times the number of rotation of the feed screw. According to this differential rotation between the feed screw 21 and the female screw 22, the traveling speed v of the female screw 22 is expressed as below.

$$v = (\text{screw pitch}) \times (\text{number of rotation of feed screw}) \times (1 - r1/r2)$$

Considering that a friction force is negligible, the pressing force generated by the female screw 22 with the rotation torque of the feed screw 21 becomes $[1/(1-r1/r2)]$ times.

A method of retaining a male screw and a female screw that has a larger diameter than the male screw in a rotatable manner each and arranging them in an eccentric manner so that a rotational motion is converted into a linear motion is described in Japanese unexamined patent publication No. 61-180064, "Method for converting rotational motion into linear motion", which can be referred to for understanding details of the method.

The following is more advantageous. In the idle running zone where the female screw 22 is fixed and does not rotate, the feed screw 21 and the female screw 22 contact and slide on each other in the same manner as ordinary screws, so that a rotational motion is converted into a linear motion. However, when the pressurizing plate 3 contacts the work so that the brake restraining rotation of the female screw 22 is released and that the female screw 22 starts to rotate, the contact point between the feed screw 21 and the female screw 22 becomes rolling contact mainly. As a result, a loss due to sliding friction is decreased, so that the rotation output of the electric motor can be converted effectively into the output of linear motion.

In addition, a friction disc element that is used for restraining rotation of the female screw 22 is not required to transmit or restrain the maximum output of the electric motor 8 unlike a clutch in the conventional structure. It is sufficient if the friction disc element has capacity that is capable of restraining a rotation torque generated on the female screw 22 by a lead angle of the screw and a friction force at the contact point, so it can be downsized.

Although a brake element is the friction disc type in the present embodiment, it is possible to adopt other methods such as a rotation on-off mechanism of a teeth engaging type.

In the description described above, according to the power transmission method of the present embodiment, rotation of the female screw 22 is restrained or released in accordance with a load, so that the traveling speed and the pressing force of the pressurizing plate can be switched in an autonomous manner.

The initial pressing force of the helical spring 28 that works as a load detecting element is required to be capable of restraining the rotation torque generated on the female screw 22 by the lead angle of the screw and the friction force at the contact point in the idle running zone. It is also required to be smaller than the thrust of the female screw 22 generated in the rotation restrained state of the female screw 22 when the feed screw 21 rotates at the maximum torque of the electric motor.

As described above, the power transmission device of the present embodiment includes the feed screw 21 that rotates by the output of the electric motor 8, the moving case 20 through which the feed screw 21 penetrates in the axis direction, the feed screw 21 being rotatable relatively to the moving case 20 so as to transmit the thrust along the axis direction of the feed screw 21 to a load, the female screw 22 disposed in the moving case 20, the female screw 22 having an effective diameter that is larger than an effective diameter of the feed screw 21 so as to generate the thrust by engaging with the feed screw 21 in an eccentric manner, a bearing 26 disposed in the moving case 20 for supporting the female screw 22 in a rotatable manner relatively to the moving case 20, the bearing 26 itself being capable of moving in the axial direction with respect to the moving case 20, a brake shoe 32 fixed to the moving case 20 for restraining relative rotation of the female screw 22 with respect to the moving case 20 when the brake lining 31 that is a side surface of the female screw 22 is pressed onto the brake shoe 32, and the spring element 28 disposed in the moving case 20 for pressing the female screw 22 via the bearing 26 in the axis direction so that the brake lining 31 that is a side surface of the female screw 22 is pressed onto the brake shoe 32 in a no load state. When the moving case 20 receives a counterforce from a load so that a thrust generated on the female screw 22 becomes larger than a restoring force of the spring element 28, the female screw 22 moves in the axis direction with respect to the moving case 20 so that the brake lining 31 separates from the brake shoe 32, and that the restraint of relative rotation of the female screw 22 with respect to the moving case 20 is released, and that the feed screw 21 and the female screw 22 rotate in a differential manner.

When the power transmission mechanism of the present embodiment is used for a pressing machine or the like that performs a press fitting process or a caulking process, quantity of spring deflection that is determined by a space between the end surface of the spring retainer 27 and the upper end surface of the bottom cover 23 of the power converting portion moving case 20 is preferably 1 mm or less. Therefore, it is preferable to set the spring to have large initial spring deflection and to use the spring having a small spring constant.

FIG. 3 is a perspective view showing an appearance of another preferred embodiment in which the power transmission mechanism of the present invention is used as a clamping device 1A.

In FIG. 3, the clamping device 1A includes an output rod cover 2a and a head cover (an upper frame) 4a that are connected and fixed to each other with a plurality of tie bars 5a and a power converting portion moving case 20a having a guide portion that can slide along the tie bars 5a as guide rods. In addition, an output rod 42a is attached to one end surface of the power converting portion moving case 20a so as to penetrate the output rod cover 2a in a slidable manner. The output rod 42a is made up of a hollow cylindrical member in the same manner as the above-mentioned output rod 42 shown in FIG. 2. The output rod 42a houses the feed screw 21 (see FIG. 2) and is provided with a male screw on the outer surface of the rod-end portion for connecting to a rod-end fitting (not shown). An electric motor 8a is fixed to the head cover 4a with bolts or the like. In a preferred example, the electric motor 8a is equipped with a feed screw 21 that is combined integrally. The output rod cover 2a shown in FIG. 3 has a pin joint fixing shape that is commonly used in a clamping pneumatic cylinder or the like, but this structure should not be considered in a limited manner.

The power transmission mechanism of the present embodiment converts a rotational motion to a linear motion by a screw mechanism, so there is no possibility that a counterforce on the load side makes the feed screw rotate in the reverse direction. Therefore, only cutting off the power supply to the electric motor in the clamped state of the target work is sufficient for keeping the current position, and it is not necessary to add a position keeping mechanism.

When the power transmission mechanism of the present embodiment is used for clamping, it is preferable to set a space between the spring retainer 27 and the bottom cover 23 of the power converting portion moving case 20 shown in FIG. 2 to a value of 2-5 mm and to use a spring having a large spring constant. The initial pressing force of the spring is set to a value that enables to restrain a rotation torque generated on the female screw 22 and is smaller than a thrust of the female screw 22 generated in the rotation restrained state of the female screw when the feed screw 21 rotates with the maximum torque of the electric motor 8 as described above. It is preferable that the pressing force of the spring at the maximum deflection of the spring, i.e., when the spring retainer 27 contacts with the bottom cover 23 is set to a value larger than the maximum thrust outputted by the differential rotation between the feed screw 21 and the female screw 22. By using this spring, the female screw 22 is rotated with the maximum output of the electric motor 8 in a differential manner. After clamping the target work, the power supply to the electric motor is shut off so that the female screw 22 is stopped at the position in a self-locking manner. Thus, secure clamp can be performed by absorbing a very small displacement that can be generated due to thermal deformation of the work itself or the like when the target work is clamped for a long period of time.

Although the helical spring 28 is used as a load detecting element (a spring element) in the present example, it is possible to use an elastic member other than the helical spring, e.g., to use a disc spring by itself or to use a plurality of disc springs having different spring constants. Such examples will be described later.

FIG. 4 is a perspective view showing an appearance of an embodiment in which an input shaft end of the power transmission mechanism in the embodiment described above is formed to have a hexagonal shape or a tetragonal shape so as to make a clamping unit 1B that is suitable for a clamping work using an external power source such as a small screw driving machine.

The clamping unit 1B shown in FIG. 4 has a structure similar to the clamping device shown in FIG. 3. It includes an output rod cover 2b and a head cover (an upper frame) 4b that are connected and fixed to each other with a plurality of tie bars 5a and a power converting portion moving case 20a having a guide portion that can slide along the tie bars 5a as guide rods. In addition, an output rod 42a is attached to one end surface of the power converting portion moving case 20a so as to penetrate the output rod cover 2a in a slidable manner. Similarly, the output rod 42a is made up of a hollow cylindrical member. The output rod 42a houses the feed screw 21 (see FIG. 2) and is provided with a female screw on the inner surface of the rod-end portion for connecting to a rod-end fitting (not shown). A rotation transmission shaft 12b has an outer surface of its end portion that is formed to have a hexagonal shape, a tetragonal shape or the like. The rotation transmission shaft 12b penetrates the head cover 4b and is connected to the feed screw 21 inside the head cover 4b.

In a large assembly device or a processing machine, a work is fixed to a work pallet, and the work pallet with the work is introduced into the device or the processing machine. In this usage, there is a long period of time between clamp and unclamp. Therefore, in the step of mounting the work on the pallet, the work is fixed manually or by a robot utilizing a screw driver or the like. This is an example indicating an application of a small clamping unit without a power source that utilizes the power transmission mechanism of the present embodiment.

A pressure loading device 1C shown in FIG. 5 indicates a preferred embodiment of a load detecting portion 50 that detects pressing force in the axial direction, i.e., a load and converts it into an electric signal.

In FIG. 5, the upper end portion of the load detecting portion 50 is fixed by the upper flange portion of a protection case 53 so as to contact with the lower end surface of the bottom cover 23. A load detecting body 51 has a deforming thin tube portion 52 at the middle portion in the axial direction and an outer surface of the lower end portion is retained by a lower guide of the protection case 53 in a slidable manner in the axis direction. A retaining flange 54 is fixed to the lower end portion of the protection case 53 with a plurality of bolts 58. A peripheral portion of the retaining flange 54 is provided with a plurality of grooves in which stepped collars 57 are fit. Bolts 56 pass through the stepped collars 57, and the lower end portion of the load detecting portion 50 is connected to the pressurizing plate 3 with the bolts 56 in the state where the lower end surface of the load detecting body 51 contacts with the pressurizing plate 3.

Then, four strain gages GU1, GU2, GU3 and GU4 are stuck to the outer surface of the deforming thin tube portion 52 at the middle portion in the axial direction and at quarter positions. These strain gages GU1-GU4 are connected to form a bridge circuit, which is connected to a connector 55 for external connection so that the load detecting portion 50 is constituted.

FIG. 6 shows a conceptional structure of the strain gage GU, which is glued to the outer surface of the deforming thin tube portion 52 (see FIG. 5) in the position of direction shown in FIG. 6. The strain gage GU is made up of a sensor gage B and a compensation gage A with three lead wire connection portions TA, TB and TC. FIG. 7 is a bridge circuit diagram showing the connected strain gages GU1-GU4 that are glued to the deforming thin tube portion 52 of the load detecting body. The strain gages GU1-GU4 are glued to the outer surface of the deforming thin tube portion 52 at positions whose phases are shifted by 90 degrees in turn as described above. The lead wire connection portions of these strain gages GU are connected so that TA with TA while TB with TB, and TC is connected to nodes EA, EB, UA and UB of the bridge circuit. The measurement of distortion is performed by applying a constant voltage of approximately 10 volts between the nodes EA and EB, and an output voltage between the nodes UA and UB is processed as a signal.

The compensation gage A compensates an output variation due to a temperature drift of the strain gage itself or a thermal deformation of the deforming thin tube portion. The strain gages that are glued to the outer surface of the deforming thin tube portion 52 at quarter positions are connected to form a bridge circuit so that deformations due to a load other than the axial direction component that may be applied to the load detecting body are canceled by each other and that only the axial direction load is detected effectively.

For example, since the load detection converting portion is disposed as a press fitting device shown in FIG. 1, a press fitting power can be detected at the same time as the press fitting is performed on a work. Therefore, an assembling work and an inspection can be performed at the same time. Since an appropriate press fitting allowance is ensured when the press fitting work is performed, it is possible to manufacture a product with high reliability.

Next, a pressure loading device 1D according to still another embodiment of the present invention will be described.

Figure 8:
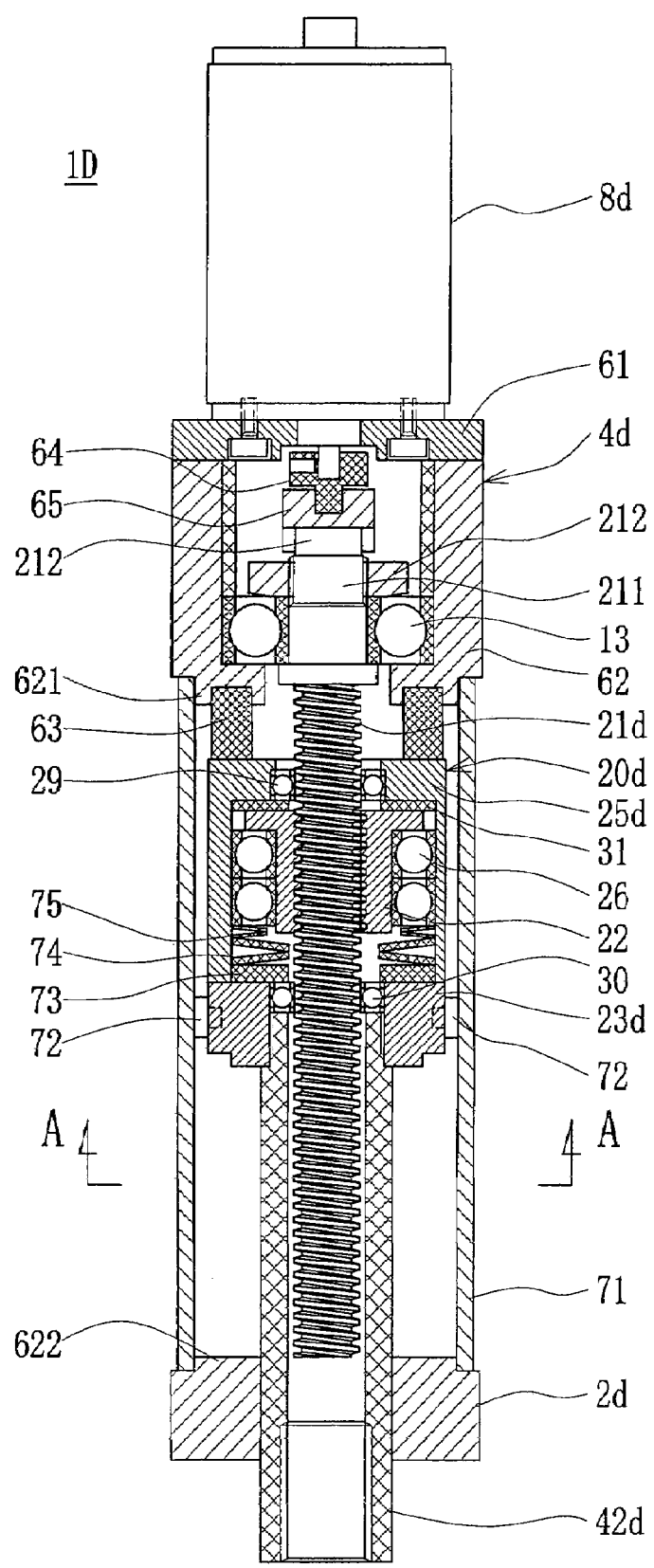
FIG. 8 is a cross section of a pressure loading device according to another embodiment.
Figure 9:
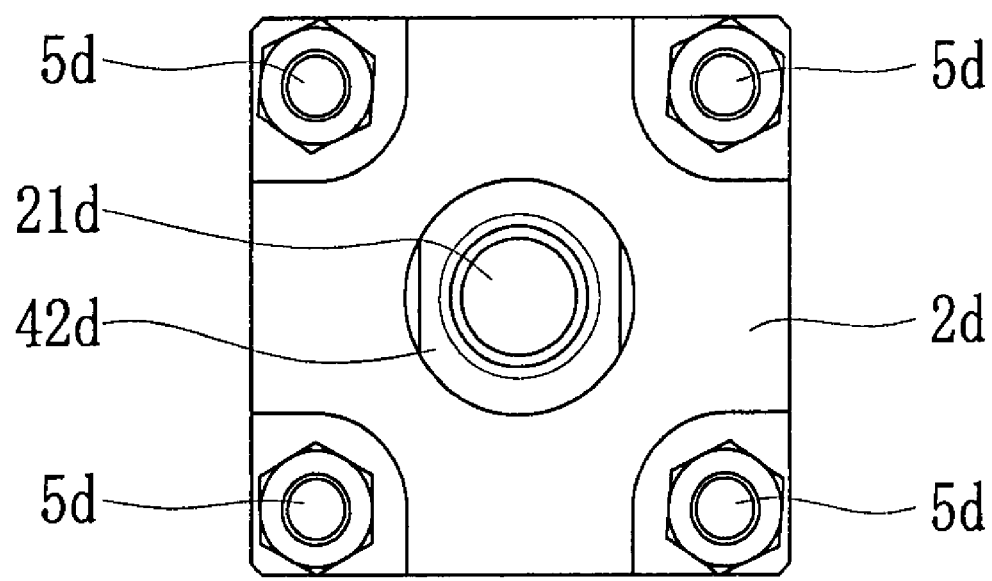
FIG. 9 is a bottom view of the pressure loading device shown in FIG. 8.
Figure 10:
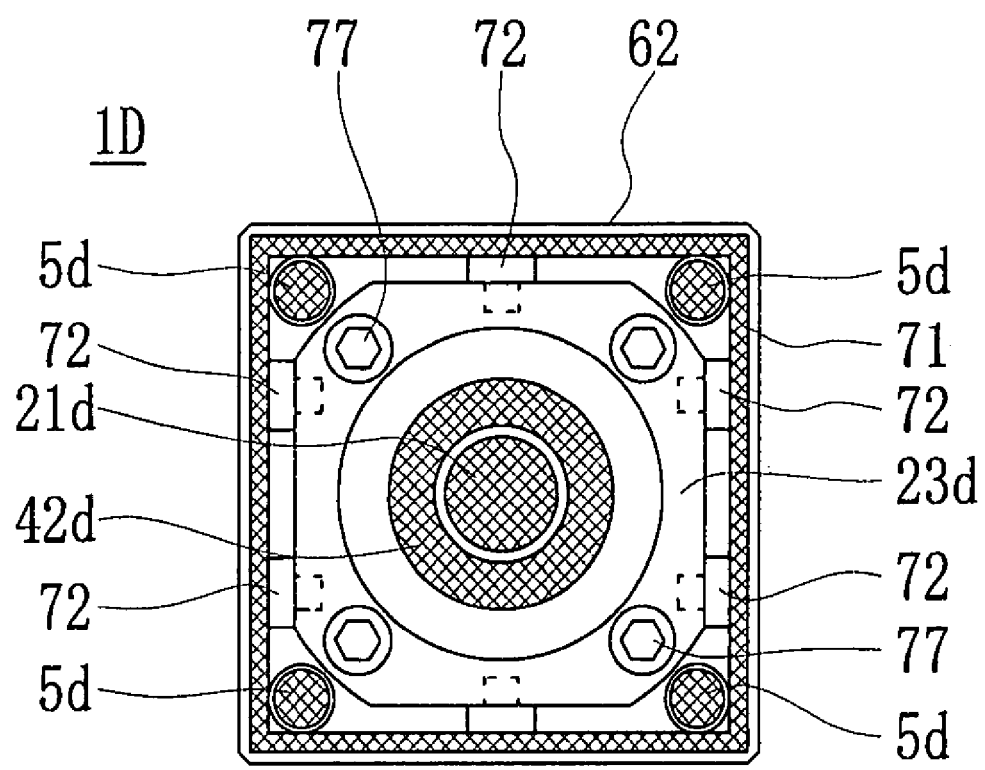
FIG. 10 is a cross section of the pressure loading device cut along the line A-A in FIG. 8.
Figure 12:
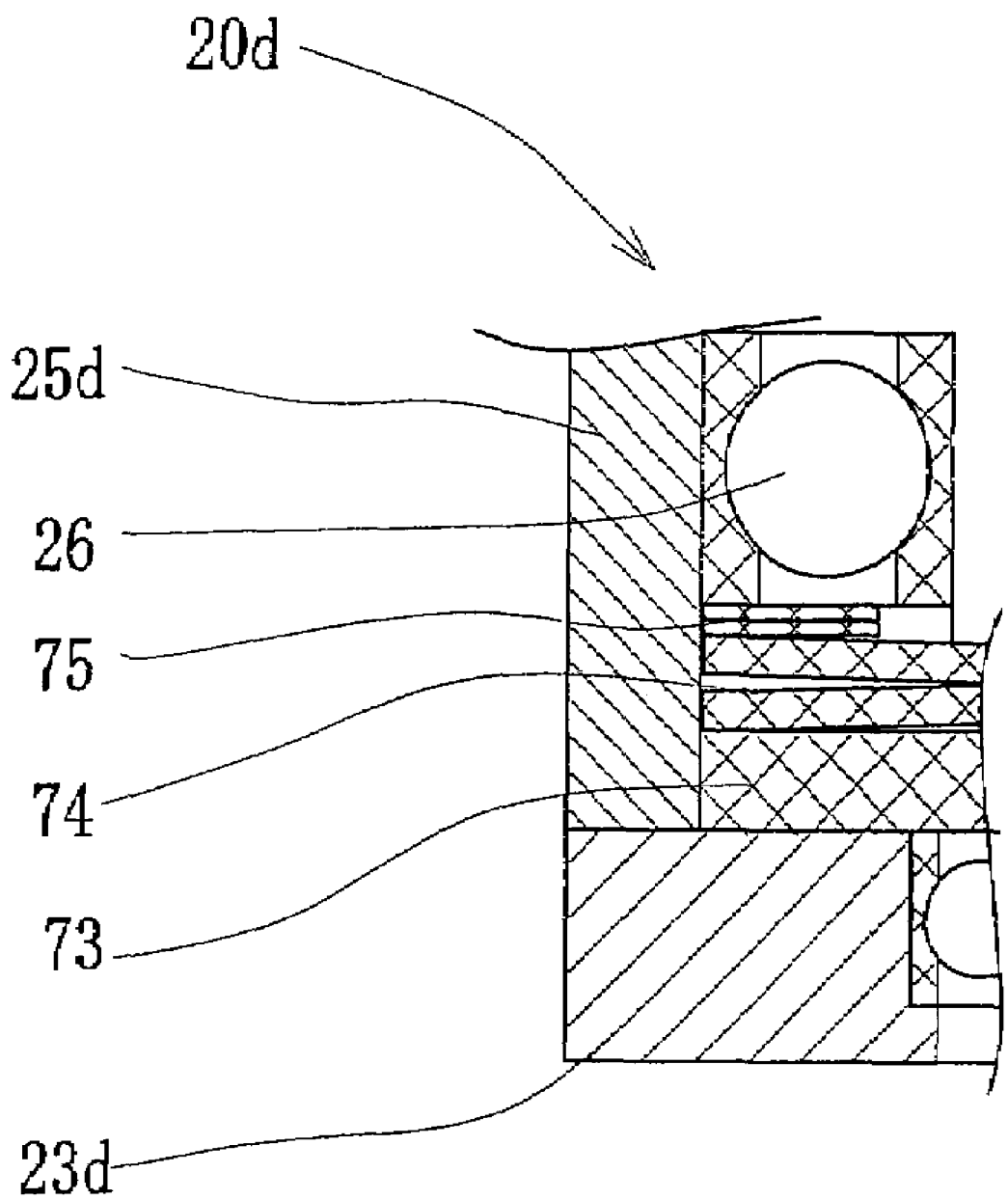
FIG. 12 is an enlarged cross section of a vicinity of a disc spring.
Figure 13:
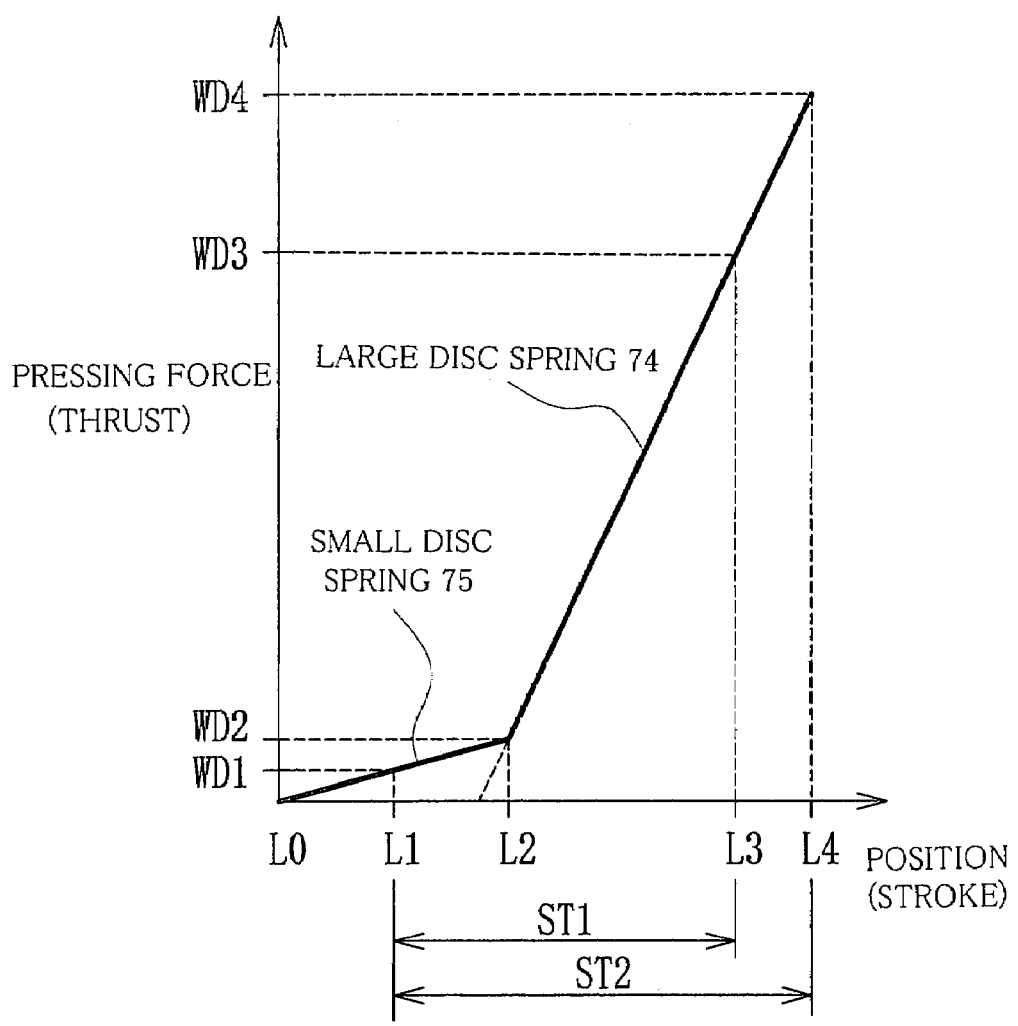
FIG. 13 is a diagram showing compressed states of a small disc spring and a large disc spring.
Figure 14:
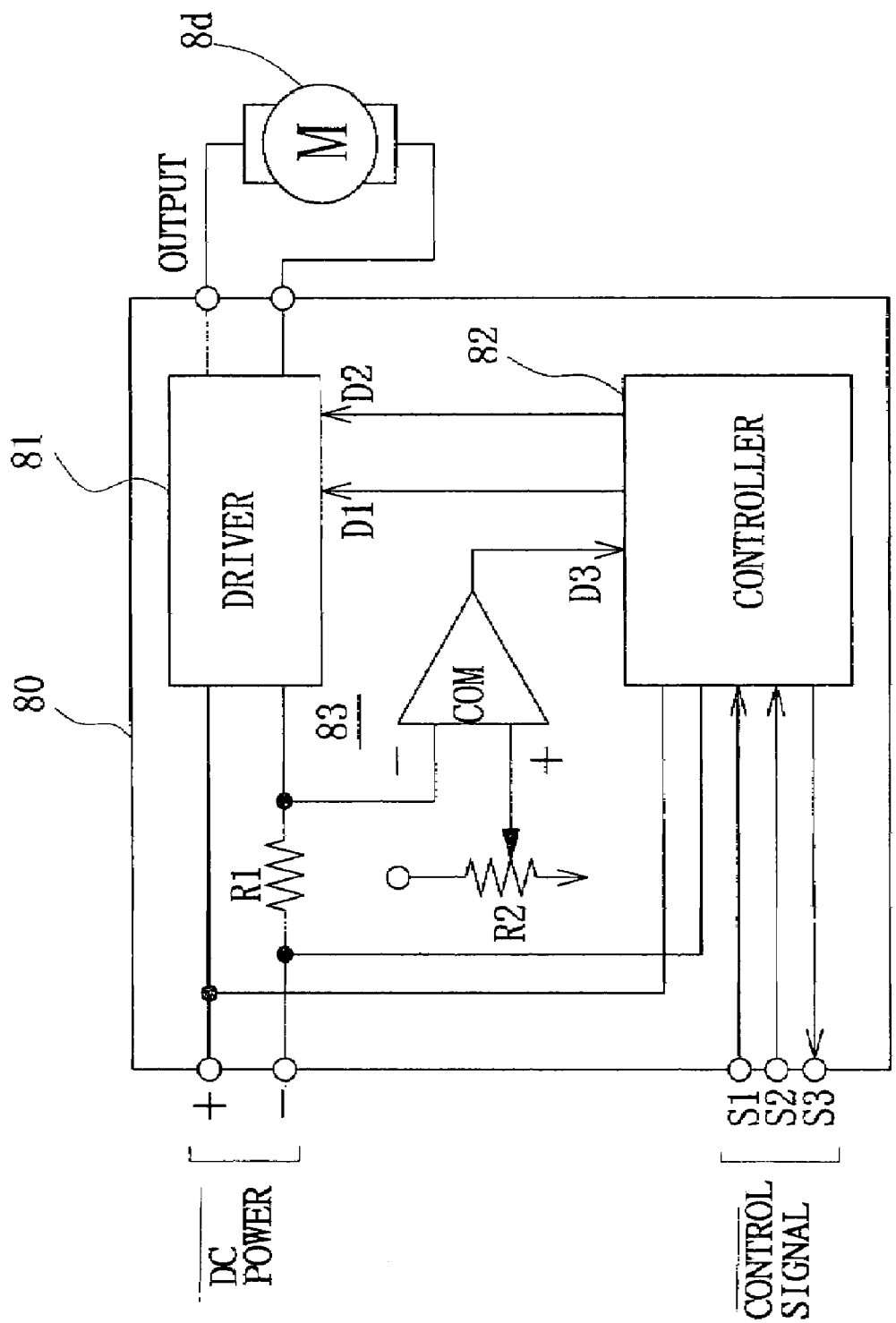
FIG. 14 is a diagram showing an example of a circuit of a control device.
Figure 15:
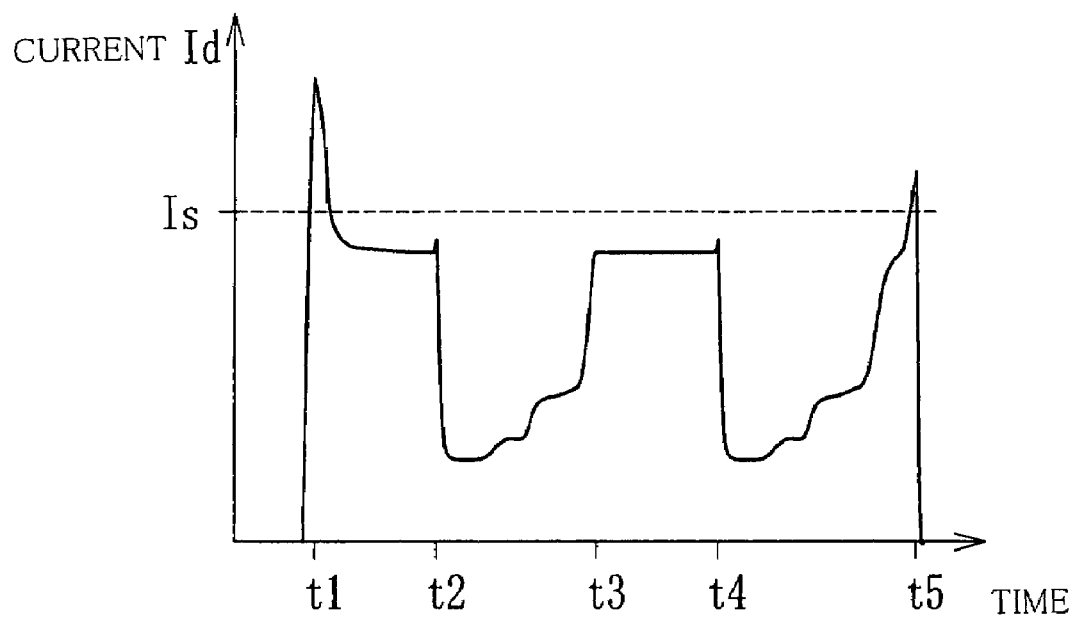
FIG. 15 is a diagram showing an example of a variation of load current in operation of the pressure loading device.

FIG. 8 is a cross section of the pressure loading device 1D of another embodiment, FIG. 9 is a bottom view of the pressure loading device 1D, FIG. 10 is a cross section of the pressure loading device 1D cut along the line A-A in FIG. 8, FIG. 11 is a cross section showing an operating state of the power converting portion moving case 20D of the pressure loading device 1D, FIG. 12 is an enlarged cross section of the vicinity of the disc spring, FIG. 13 is a diagram showing compressed states of the small disc spring 75 and the large disc spring 74, FIG. 14 is a diagram showing an example of a circuit of the control device 80, and FIG. 15 is a diagram showing an example of a variation in load current Id while the pressure loading device 1D is operating.

Note that parts having the same functions as those in the pressure loading device 1 shown in FIG. 1 are denoted by the same reference numerals so that description thereof can be omitted or simplified.

As shown in FIGS. 8 to 10, the pressure loading device 1D is made up of an electric motor 8d, a head cover (an upper frame) 4d, an output rod cover 2d, a power converting portion moving case 20d, an output rod 42d, a casing 71 and the like.

An upper plate 61 of the head cover 4d is made of a metallic material such as iron and is formed in a substantially rectangular plate-like shape. It is connected to the output rod cover 2d that is also formed in a substantially rectangular plate-like shape made of a steel material with four tie bars 5d. The electric motor 8d is fixed to the upper plate 61 with bolts.

A block member 62 of the head cover 4d is made of a metallic material such as an aluminum alloy and is formed to have an outer shape of a rectangular solid. It has a cylindrical hole at the middle portion for housing a joint member or the like that will be described later. Between a circular portion 621 provided on the lower end surface of the block member 62 so as to protrude from the surface and a circular portion 622 provided on the upper end surface of the output rod cover 2d so as to protrude from the surface, there is provided the casing 71 that is made of a metallic material such as an aluminum alloy to be a rectangular tube and has an inner surface having a square cross section that contacts outer faces of the circular portions 621 and 622.

A joint member 64 is attached to the output shaft of the electric motor 8d, and this joint member 64 constitutes an Oldham coupling for transmitting a rotation force while absorbing the eccentricity together with an intermediate joint member 65 and a coupling portion 212 formed on the upper end portion of a feed screw 21d so as to protrude like a plate. The rotation force of the electric motor 8d is transmitted to the feed screw 21d of the Oldham coupling.

The feed screw 21d has the upper end portion that is a threaded shaft 211 and is fastened by a nut 212 sandwiching a ring inside the ball bearing 13, so that the feed screw 21d is supported in a rotatable manner.

The power converting portion moving case 20d include a housing that is made up of a housing body 25d that is made of a metallic material such as an aluminum alloy to be formed like a vessel opening downward, and a bottom cover 23d that is attached to the lower end surface of the housing body 25d with bolts 77.

Each of the upper end surface and the bottom cover 23d of the housing body 25d is provided with a circular hole that has an axis matching an axis of the feed screw 21d, and ball bearings 29 and 30 are fitted in these holes. The feed screw 21d penetrates these ball bearings 29 and 30 in a slidable manner. The inner surface of the housing body 25d is formed to be a cylindrical surface having an axis eccentrically shifted from the axis of the feed screw 21d. Inside the inner surface, there are disposed a bearing 26, a female screw 22, a spring retainer 73, a large disc spring 74 and a small disc spring 75.

The large disc spring 74 and the small disc spring 75 have the same function as the helical spring 28 described with reference to FIG. 2. Since two springs including the large disc spring 74 and the small disc spring 75 having different spring constants are used so that their restoring forces work in series, the load detection can be performed correctly. Thus, a speed and a thrust can be switched smoothly, and an impact at an end of movement can be absorbed appropriately. This will be described later in detail.

Six holes having a cylindrical shape are formed in the outer surface of the bottom cover 23d, and sliders 72, 72 . . . are fitted in the holes. The slider 72 is made of a synthetic resin or the like having lubricity and includes a cylindrical head portion having a large diameter and a fit-in portion that has a smaller diameter than the head portion and protrudes from the end surface of the head portion in a concentric manner. A whole of the power converting portion moving case 20d is inserted in the casing 71 in the state where the fit-in portion of the slider 72 is fitted in the hole of the bottom cover 23d. Since the head portion of the slider 72 contacts with the inner surface of the casing 71, the power converting portion moving case 20d is positioned with respect to the casing 71 in the radial direction and is slidable in the axis direction.

In addition, a plurality of round holes are formed in the lower end surface of the block member 62, and dampers 63 made of a synthetic rubber or the like to have a cylindrical shape are fitted in the holes and fixed with adhesive or the like. The power converting portion moving case 20d contacts the damper 63 when it moves to an end of stroke of the upper end side in FIG. 8, so that an impact can be relieved and excessive engagement of the feed screw 21d can be prevented. Note that the damper 63 may be fixed not to the block member 62 but to the housing body 25d.

Next, actions of the large disc spring 74 and the small disc spring 75 will be described.

As shown in FIG. 8, the large disc spring 74 and the small disc spring 75 are placed between the bearing 26 and the spring retainer 73 inside the power converting portion moving case 20d in an initial deflection state where the initial pressing force is generated.

In other words, as shown in FIG. 13, a combined pressing force WD generated by the large disc spring 74 and the small disc spring 75 becomes an initial pressing force WD1 at an initial deflection position L1. A load curve varies in accordance with the spring constant of the small disc spring 75 until a position L2 where the small disc spring 75 is deformed at a maximum ratio (a position shown in FIG. 11(A)). After the position L2 where the small disc spring 75 is deformed at a maximum ratio, the load curve varies in accordance with the spring constant of the large disc spring 74. In other words, the entire deflection allowance of the large disc spring 74 and the small disc spring 75 is a maximum deflection stroke ST2 from the initial deflection position L1 to a maximum deflection position L4, and the female screw 22 can move this length inside the housing body 25d.

A maximum pressing force WD4 at the maximum deflection position L4 is set to a value larger than a maximum thrust generated on the female screw 22 (a maximum operation pressing force WD3). Therefore, the large disc spring 74 and the small disc spring 75 are compressed actually during an operational deflection stroke ST1 from the initial deflection position L1 to an operational maximum deflection position L3 (at the position of the state shown in FIG. 11(B).

In this way, when the female screw 22 generates the maximum thrust WD3, the large disc spring 74 still has a remaining deflection allowance as shown in FIG. 12 in an enlarged manner. This deflection allowance absorbs various impacts applied to the output rod 42d and displacement due to thermal deformation, so that an excessive force is not applied to the feed screw 21d. In addition, when the maximum thrust is applied to the work from the output rod 42d by the rotation of the electric motor 8d and then the electric motor 8d is about to be reversed to make the output rod 42d go back, it is possible to avoid occurrence of the situation that the electric motor 8d cannot be reversed because of an excessive friction force between the feed screw 21d and the female screw 22.

In addition, since the initial pressing force WD1 is generated by the small disc spring 75, even a small initial pressing force WD1 can obtain a relatively long stroke. Therefore, even if each portion does not have high accuracy of its size, the pressing force WD1 as designed can be obtained easily for a stable operation.

In FIG. 14, the control device 80 includes a driver 81, a controller 82, a current detection circuit 83.

The driver 81 is a power circuit that is supplied with dc current externally and controls the electric motor 8d in accordance with control signals D1 and D2. More specifically, it controls so that two-bit control signals D1 and D2 of "00", "01", "10" and "11" correspond respectively to "brake", "forward", "reverse" and "stop" as the operating states of the electric motor 8d.

The current Id supplied to the driver 81 generates a voltage across the ends of resister R1, and this voltage is compared with a predetermined voltage in a comparator COM. If the current Id is larger than a threshold value Is, an excessive current detection signal D3 is outputted to the controller 82.

The controller 82 receives instruction signals S1 and S2 inputted externally, which indicate one of instructions including "forward", "reverse" and "stop." In accordance with this instruction, it outputs the control signals D1 and D2. However, if the excessive current detection signal D3 is inputted, the control signals D1 and D2 indicating "stop" or "brake" are outputted even if the instruction signals S1 and S2 indicate "forward" or "reverse." The excessive current detection signal D3 is outputted externally as a status signal S3.

As shown in FIG. 15, the instruction signals S1 and S2 indicating "forward" are received externally at the time point t1, and thus the control signals D1 and D2 indicating "forward" are outputted, so that the electric motor 8d is supplied with current Id and rotates. In the startup period, the current Id exceeds the threshold value Is as shown in FIG. 15, but the excessive current during the startup period is ignored so that the status signal S3 is not outputted.

When the electric motor 8d is started, the output rod 42d moves forward (extends) and abuts the work at the time point t2 so as to change to a high thrust mode. As shown in FIG. 15, the current Id is smaller than or equal to the threshold value Is in each of a high speed mode and the high thrust mode. In addition, the current Id decreases at the time point t2 when the high speed mode changes to the high thrust mode. During the period when the output rod 42d is moving forward in the high thrust mode, the current Id increases or decreases in accordance with a variation of the load. When it presses the work fully and cannot press any more at time point t5, the current Id increases and exceeds the threshold value Is. Then, the electric motor 8d stops, and at the same time the status signal S3 is outputted externally.

In this way, the control device 80 controls the electric motor 8d to stop when excessive current flows in the electric motor 8d. Therefore, it is possible to avoid a situation where the feed screw 21d rotates excessively and is gripped by the female screw 22.

In addition, as understood from FIG. 15, if the threshold value Is is a rated current of the electric motor 8d, the electric motor 8d can be operated most efficiently by operating so that the current Id becomes lower than or equal to the threshold value Is and close to the threshold value Is as much as possible. Therefore, an efficient pressure loading device 1D can be obtained using a small electric motor 8d by designing the entire pressure loading device 1D so that the current Id of the electric motor 8d becomes as described above in each of the high speed mode and the high thrust mode.

In the embodiments described above, an example is described in which applying pressure or increasing pressure is performed on the press side, i.e., when the output rods 42, 42a and 42d are driven to extend. In contrast, by reversing the positions of the parts, applying pressure or increasing pressure can be performed on the pull side, i.e., when the output rods 42, 42a and 42d are driven to contract.

For example, in the pressure loading device 1D, parts attached inside the housing body 25d, i.e., the brake lining 31, the female screw 22, the bearing 26, the small disc spring 75, the large disc spring 74 and the spring retainer 73 are disposed in this order from the bottom cover 23d side. Thereby, the pressure loading device 1D is operable to perform pressure application on the pull side. Note that, in such a case, the damper 63 may be disposed, for example, on the output rod cover 2d so that an impact between the bottom cover 23d and the output rod cover 2d is reduced.

The invention claimed is:

1. A power transmission method for converting a rotational motion of an electric motor into a linear motion, the method comprising the steps of;
    disposing a feed screw that rotates by an output of the electric motor;
    disposing a moving case through which the feed screw penetrates in the axis direction, the feed screw being rotatable relatively to the moving case so as to transmit a thrust along the axis direction of the feed screw to a load;
    disposing a female screw in the moving case, the female screw having an effective diameter that is larger than an effective diameter of the feed screw so as to generate the thrust by engaging with the feed screw in an eccentric manner;
    disposing a bearing in the moving case for supporting the female screw in a rotatable manner relatively to the moving case, the bearing itself being capable of moving in the axis direction with respect to the moving case;
    disposing a spring element in the moving case for pressing the female screw via the bearing in the axis direction and for pressing one end surface of the female screw onto the inner surface of the moving case in a no load state; and
    rotating the feed screw by the electric motor so that the rotation of the feed screw generates the thrust on the female screw and the moving case, and that when a thrust generated on the female screw due to a counterforce received by the moving case from a load becomes larger than a restoring force of the spring element, the female screw moves in the axis direction with respect to the moving case so that one end surface of the female screw separates from the inner surface of the moving case, and that the restraint of relative rotation of the female screw with respect to the moving case is released, and that the feed screw and the female screw rotate in a differential manner to generate the thrust.

2. A pressure loading device equipped with the power transmission device according to claim 1, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

3. The pressure loading device according to claim 2, wherein the casing is a rectangular tube, and the outer surface of the moving case is provided with a slider made of a synthetic resin that contacts with the inner surface of the casing and slides on the same.

4. A power transmission device for converting a rotational motion of an electric motor into a linear motion, the device comprising:
    a feed screw that is connected to an output shaft of the electric motor so as to rotate;
    a female screw having an effective diameter that is larger than an effective diameter of the feed screw;
    a moving case whose relative rotation is restrained with respect to rotation of the feed screw;
    a bearing for supporting loads in the radial direction and in the axis direction so that the female screw can rotate in the moving case and can slide in the axis direction; and
    a spring element for pressing a brake disk that is disposed in the moving case and is attached to an end surface of the female screw integrally onto one of inner surfaces of the moving case, wherein
    the feed screw penetrates bearings that are disposed at both end covers of the moving case and is arranged in an eccentric manner from the female screw housed in the moving case, and
    when the moving case receives a counterforce from a load so that a thrust generated on the female screw becomes larger than a pressing force of the spring element, the female screw moves in the axis direction with respect to the moving case so that the brake disk separates from one of the inner surfaces of the moving case, and that the restraint of relative rotation of the female screw with respect to the moving case is released, and that the feed screw and the female screw rotate in a differential manner.

5. The power transmission device according to claim 4, wherein the feed screw has a cross section of a polygonal shape at a part connected to the output shaft of the electric motor.

6. The power transmission device according to claim 5, wherein the end surface of the moving case is provided integrally with a load converting portion for detecting a thrust in the axis direction and for converting the detected thrust into an electric signal.

7. A pressure loading device equipped with the power transmission device according to claim 5, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

8. A pressure loading device equipped with the power transmission device according to claim 4, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

9. The power transmission device according to claim 4, wherein the end surface of the moving case is provided integrally with a load converting portion for detecting a thrust in the axis direction and for converting the detected thrust into an electric signal.

10. A pressure loading device equipped with the power transmission device according to claim 9, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

11. The power transmission device according to claim 4, wherein an initial pressing force of the spring element is set to a value smaller than or equal to a force for moving the female screw by a rotation torque of the feed screw in the state where rotation of the female screw is restrained, and a restoring force of the spring element at the maximum deflection is set to a value larger than a thrust generated by differential rotation due to rotation of the female screw.

12. The power transmission device according to claim 11, wherein the feed screw has a cross section of a polygonal shape at a part connected to the output shaft of the electric motor.

13. A pressure loading device equipped with the power transmission device according to claim 11, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

14. The power transmission device according to claim 11, wherein the end surface of the moving case is provided integrally with a load converting portion for detecting a thrust in the axis direction and for converting the detected thrust into an electric signal.

15. The power transmission device according to claim 11, wherein the spring element is made up of two types of disc springs having different spring constants arranged so that their restoring force act in series.

16. The power transmission device according to claim 15, wherein the feed screw has a cross section of a polygonal shape at a part connected to the output shaft of the electric motor.

17. The power transmission device according to claim 15, wherein the end surface of the moving case is provided integrally with a load converting portion for detecting a thrust in the axis direction and for converting the detected thrust into an electric signal.

18. A pressure loading device equipped with the power transmission device according to claim 15, comprising an upper frame to which the electric motor is attached, an output rod cover, and a casing disposed between the upper frame and the output rod cover, wherein
    the upper frame, the casing and the output rod cover are connected to each other integrally with a tie bar, and
    the moving case is arranged in a slidable manner along the inner surface of the casing in the axis direction, and an output rod is attached to the moving case so that the output rod penetrates the output rod cover in a slidable manner.

19. A power transmission device for converting a rotational motion of an electric motor into a linear motion that is transmitted to a load, the device comprising:
    a feed screw that rotates by an output of the electric motor;
    a moving case through which the feed screw penetrates in the axis direction, the moving case being rotatable relatively to the feed screw so as to transmit a thrust along the axis direction of the feed screw to a load;
    a female screw disposed in the moving case, the female screw having an effective diameter that is larger than an effective diameter of the feed screw so as to generate the thrust by engaging with the feed screw in an eccentric manner;
    a bearing disposed in the moving case for supporting the female screw in a rotatable manner relatively to the moving case, the bearing itself being capable of moving in the axis direction with respect to the moving case;
    a brake shoe fixed to the moving case for restraining relative rotation of the female screw with respect to the moving case when an end surface of the female screw is pressed onto the brake shoe; and a spring element disposed in the moving case for pressing the female screw via the bearing in the axis direction so that an end surface of the female screw is pressed onto the brake shoe in a no load state, wherein when the moving case receives a counterforce from a load so that a thrust generated on the female screw becomes larger than a restoring force of the spring element, the female screw moves in the axis direction with respect to the moving case so that the end surface separates from the brake shoe, and that the restraint of relative rotation of the female screw with respect to the moving case is released, and that the feed screw and the female screw rotate in a differential manner.

20. A pressure loading device equipped with the power transmission device according to claim 19, comprising an upper frame to which the electric motor is attached, an output rod cover, and a casing disposed between the upper frame and the output rod cover, wherein the upper frame, the casing and the output rod cover are connected to each other integrally with a tie bar, and the moving case is arranged in a slidable manner along the inner surface of the casing in the axis direction, and an output rod is attached to the moving case so that the output rod penetrates the output rod cover in a slidable manner.

* * * * *